May 23, 1933.  E. H. CAHILL  1,911,142
APPARATUS FOR CORRECTING TILTED PHOTOGRAPHS
Filed July 25, 1930  8 Sheets-Sheet 1
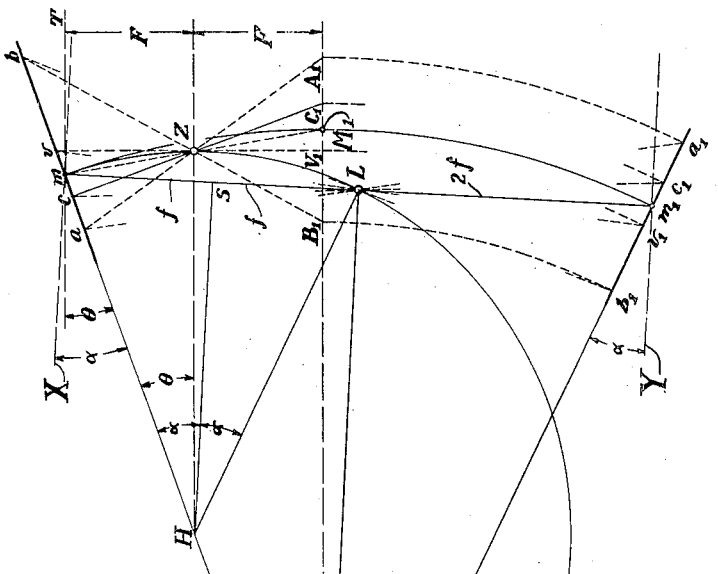
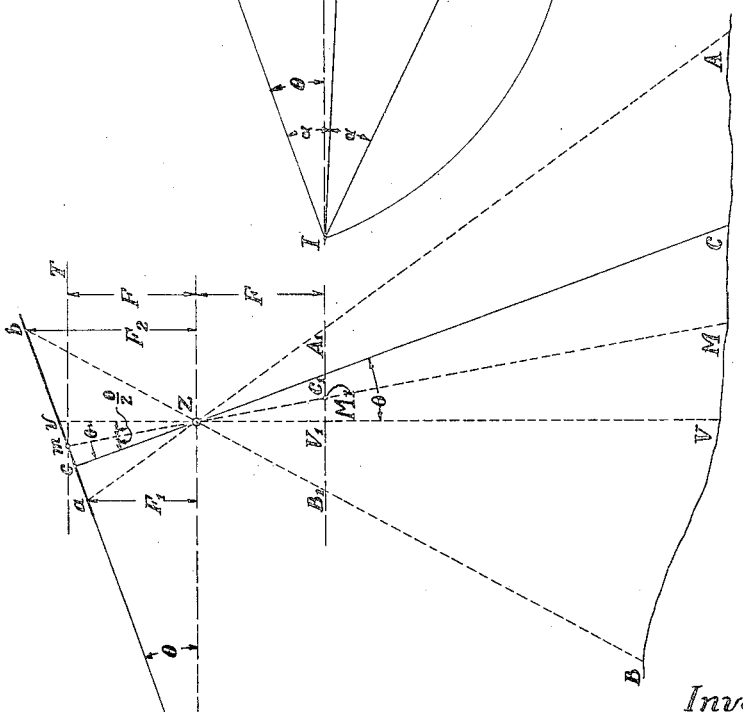
Inventor
Edward H. Cahill
by E. C. Sanborn
his Attorney

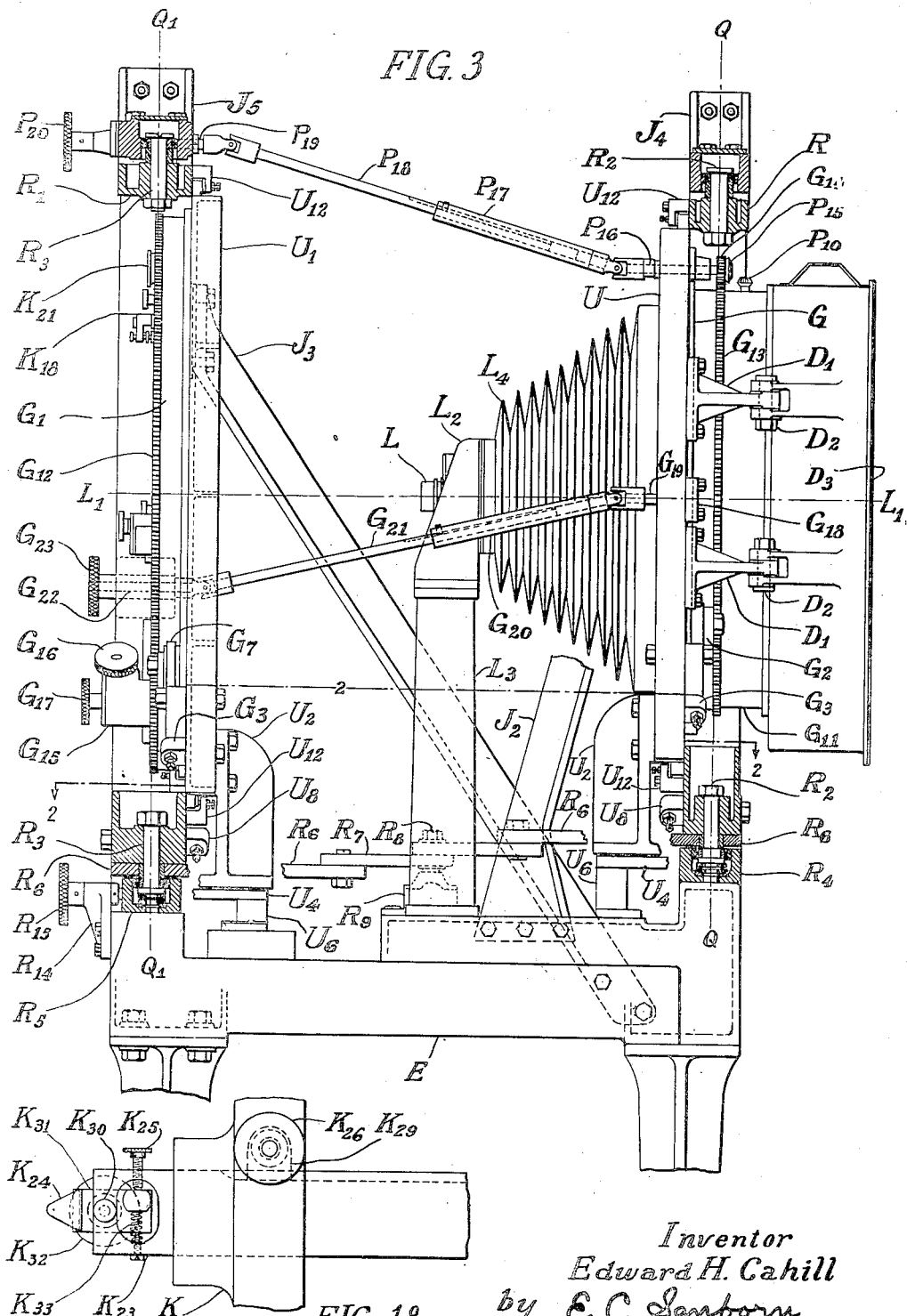

May 23, 1933.  E. H. CAHILL  1,911,142
APPARATUS FOR CORRECTING TILTED PHOTOGRAPHS
Filed July 25, 1930   8 Sheets-Sheet 3

Inventor
Edward H. Cahill
by E. C. Sanborn
his Attorney

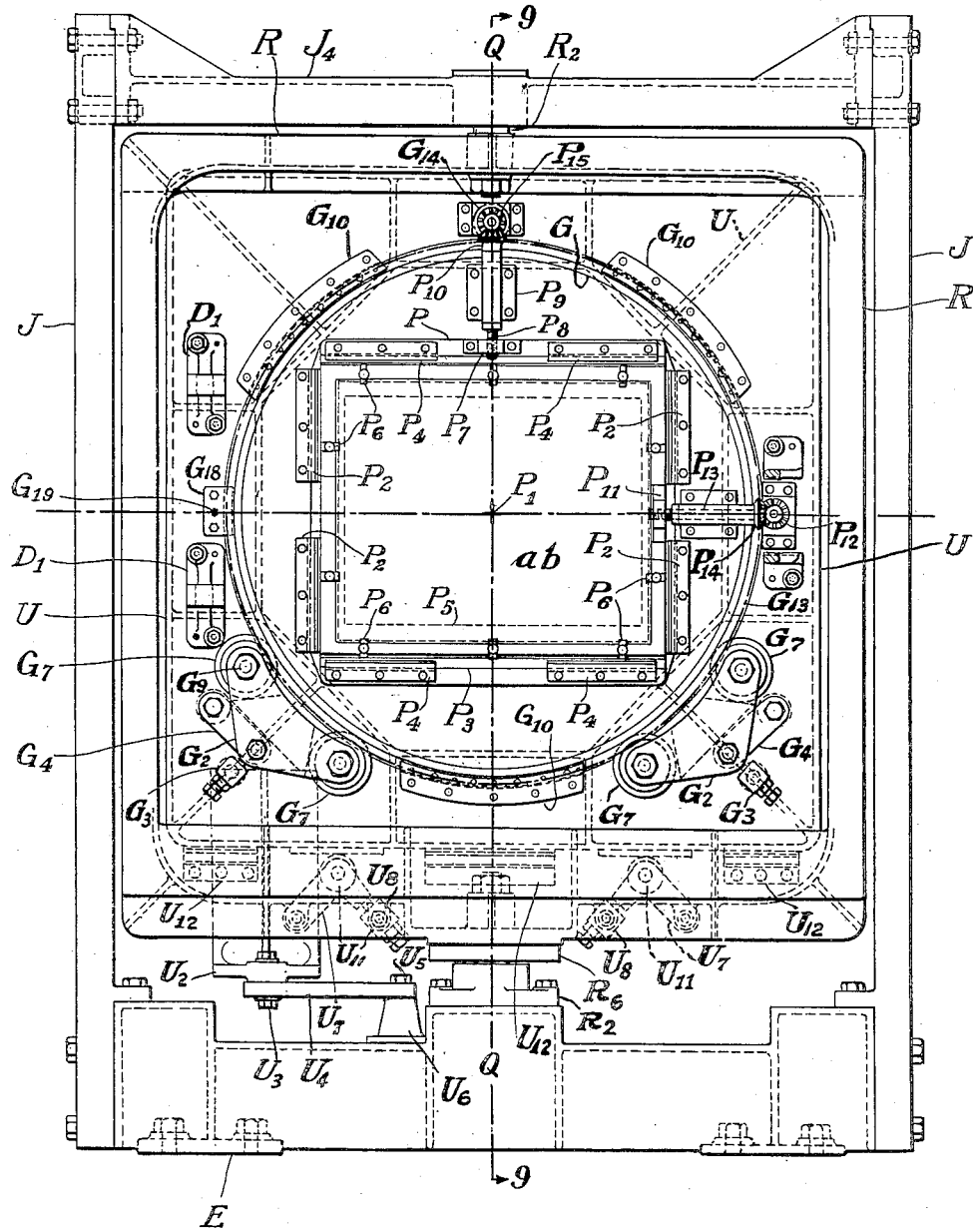

May 23, 1933.  E. H. CAHILL  1,911,142
APPARATUS FOR CORRECTING TILTED PHOTOGRAPHS
Filed July 25, 1930  8 Sheets-Sheet 5

Inventor
Edward H. Cahill
by E. C. Sanborn
his Attorney

May 23, 1933. E. H. CAHILL 1,911,142
APPARATUS FOR CORRECTING TILTED PHOTOGRAPHS
Filed July 25, 1930 8 Sheets-Sheet 6

Inventor
Edward H. Cahill
by E. C. Sanborn
his Attorney

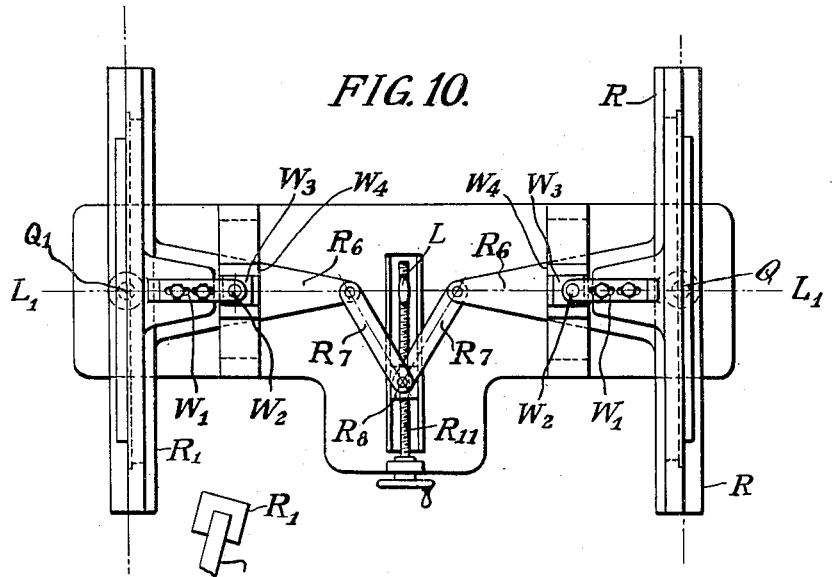
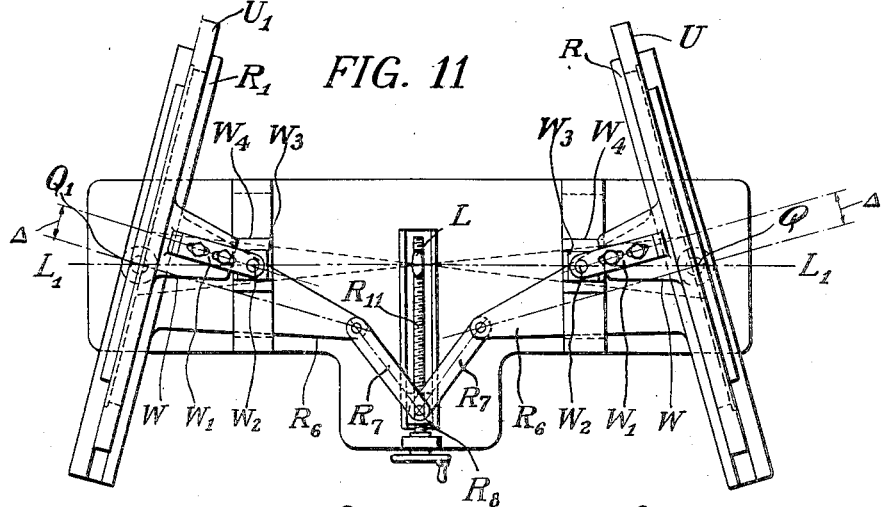
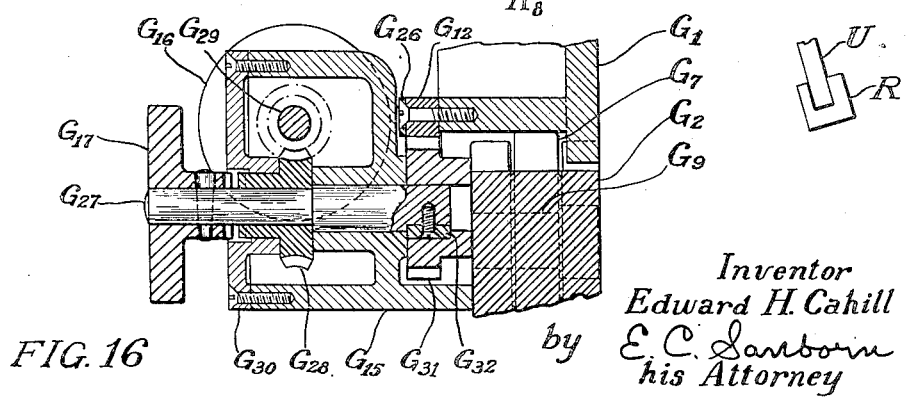

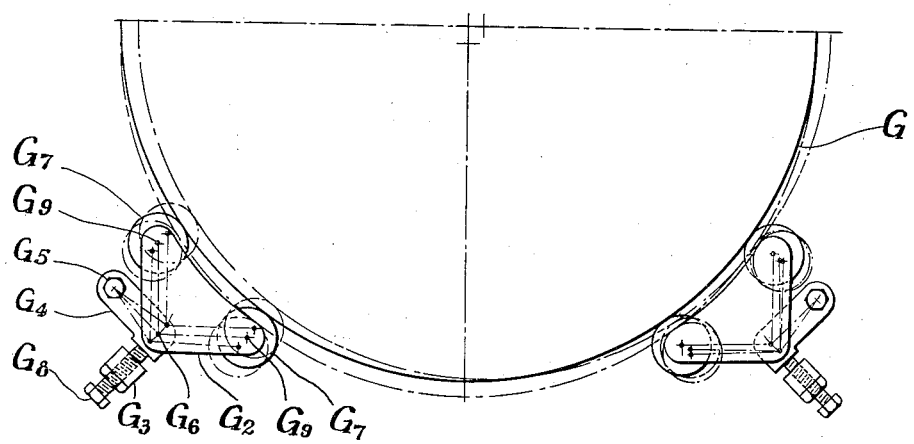
FIG. 12
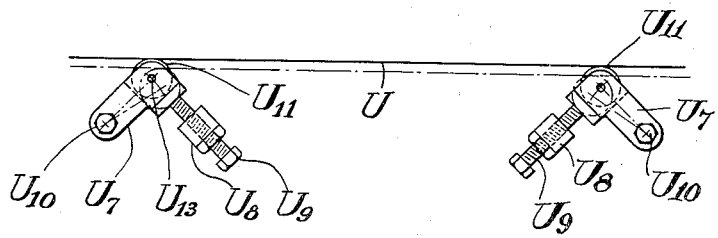
FIG. 13
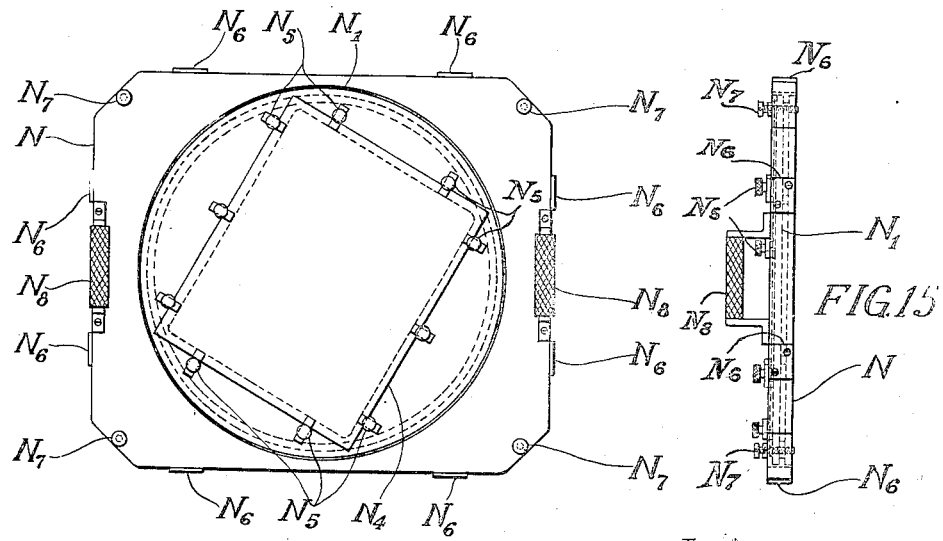
FIG. 14
FIG. 15
Inventor
Edward H. Cahill
by E. C. Sanborn
his Attorney Patented May 23, 1933

1,911,142

UNITED STATES PATENT OFFICE

EDWARD H. CAHILL, OF PHILADELPHIA, PENNSYLVANIA, ASSIGNOR TO BROCK & WEYMOUTH, INCORPORATED, OF PHILADELPHIA, PENNSYLVANIA, A CORPORATION OF DELAWARE

APPARATUS FOR CORRECTING TILTED PHOTOGRAPHS

Application filed July 25, 1930. Serial No. 470,635.

My invention relates to apparatus for projecting photographs so that the effects of tilt are eliminated from their reproductions. It relates particularly to the projection of pictures used in making maps and taken with a camera carried on an aeroplane in flight. An object of the invention is the provision of improved means whereby tilted pictures may be expeditiously and accurately projected so that their projections or reproductions will be the equivalents of horizontal views taken from the same view points. One of the features of the invention comprises means for readily locating the point where a vertical line through the camera lens intersected an aerial photograph at the instant of exposure, the location of which point aids in the preparation of maps of a high degree of accuracy. Another feature consists of the provision of means for tilting the object plane of a projector and simultaneously shifting said plane in functional proportion to the angle of tilt thereof, whereby the line of true scale of a view may be brought into the tilt axis of the object plane without the necessity of computing the amount of displacement for the angle of tilt. In addition, I provide for tilting and shifting the image plane simultaneously with the object plane, the shifting of the image plane enabling the location on the projected picture of the image of the ground point at the foot of the vertical that passed through the camera lens at the instant of exposure. Provisions in the image plane for viewing and measuring the images in the projected picture with the utmost accuracy and precision constitute another important feature of my invention. Other features of the invention will be hereinafter described and claimed.

A picture of known inclination can be readily corrected in my projector, but when two of my projectors are used together a pair of stereoscopic pictures of unknown tilt can be projected so that their reproductions will be equivalents of pictures taken while the optical axis of the camera was vertical. In other words, two of my projectors constitute a means for accurately determining the unknown angle of inclination of each picture of a stereoscopic pair of aerial pictures. The method of correcting tilted pictures with my projector is described in my application No. 295,453 for U. S. Letters Patent, filed July 26, 1928, of which the present application is a continuation. The theory on which my projecting apparatus is designed and a description of the apparatus itself will be better understood with the help of the accompanying drawings, of which:

Fig. 1 represents an aerial picture in the making.

Fig. 2 is a diagram describing the theory of correcting the picture equivalent to one taken with a vertical lens axis.

Fig. 3 is a sectional side elevation of the projector.

Fig. 5 is an end view, looking toward the object plane, and with the light house removed.

Fig. 10 is a schematic diagram showing the tilting mechanism and tangential displacing or shifting levers.

Fig. 11 is the diagram of Fig. 10 with planes tilted and shifted.

Fig. 12 shows the adjustment of equalizing bearings of the rotators.

Fig. 13 shows the adjustment of bearings of the slides.

Fig. 14 is a view in front elevation of a plate receiver for the image plane.

Fig. 15 is a view in end elevation of said receiver.

Fig. 16 is a detail view of means for adjusting the rotator of the image plane.

Figs. 17 and 18 are detail views of means for determining, on a corrected picture, the point of intersection of the main grid lines of the image screen.

Figure 4:
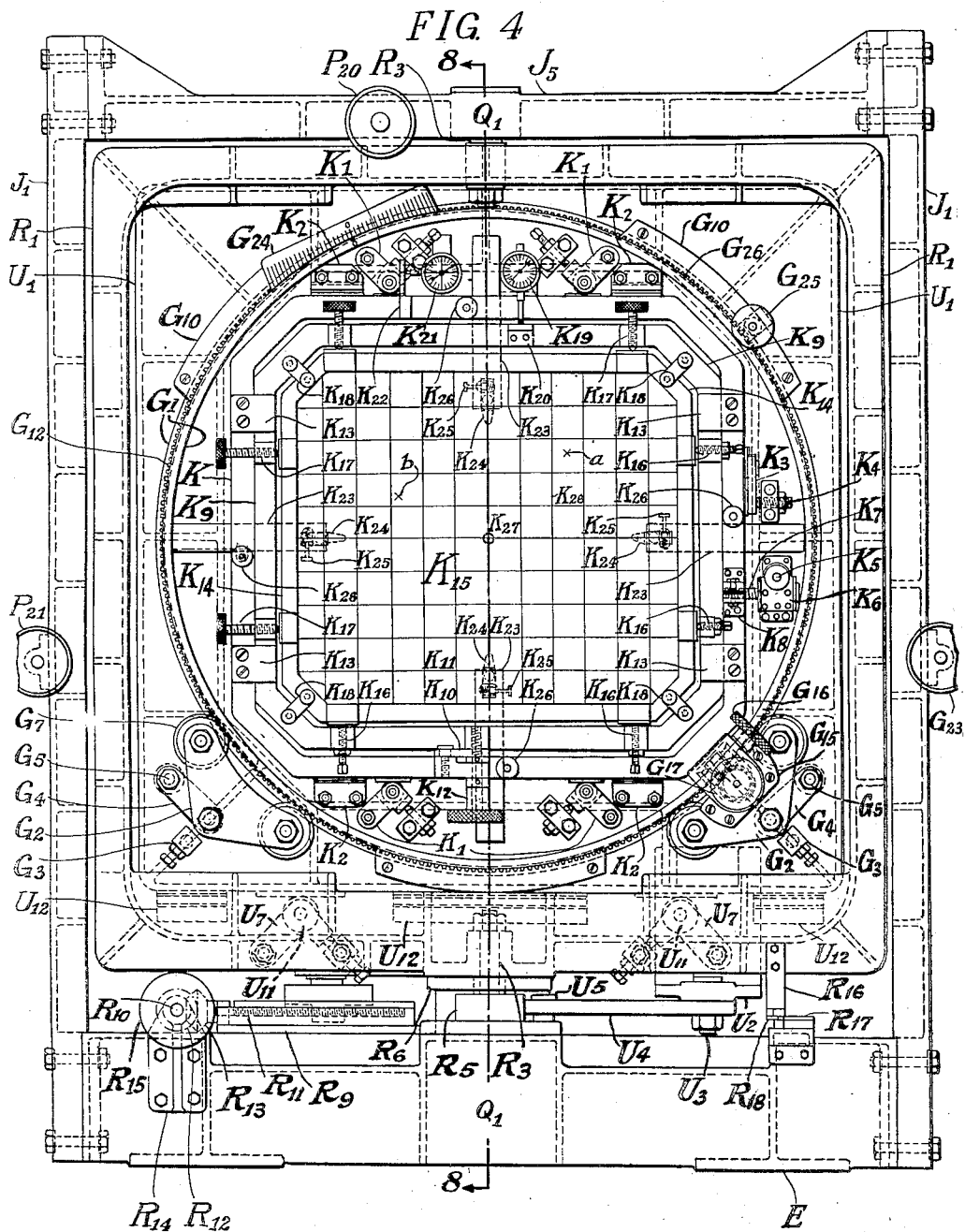
Fig. 4 is an end view, looking toward the image plane.

Fig. 1 represents an aerial picture $ab$ of the ground BA, taken while the optical axis $cZC$ of the camera was inclined at the angle $\theta$ to the vertical $vZV$. The horizontal plane $mT$ at the focal distance F above the camera lens Z represents the ideal horizontal picture plane. A horizontal plane through the lens point Z will intersect the prolonged picture plane $ab$ at the horizon line H and $m$ represents the intersection line of the oblique picture plane $ab$ and the ideal horizontal picture plane $mT$. The images in this line are the only ones that have not be affected by tilt; all images in lines at the right of $m$, such as $v$ and $b$, are too large, and all at the left, such as $a$ and $c$, are too small. That is to say, the relative sizes of the images in lines represented by $a$ and $b$ will be equal to those formed by lenses of focal lengths $F_1$ and $F_2$ respectively. It is obvious that the sizes of images in the prolonged oblique plane appoach zero as they approach the horizon line H.

Since $cZ$ equals the focus F, by similarity of triangles it will be found that:

$$cv = F \tan \theta = C_1 V_1,$$

$$cm = F \tan \frac{\theta}{2} = M_1 V_1,$$

and $$mv = F\left(\tan \theta - \tan \frac{\theta}{2}\right) = C_1 M_1$$

Therefore, to project an oblique to a horizontal picture plane the distance $cm$ must be enlarged to equal $mv$ and $mv$ must be reduced to equal $cm$, as is indicated by $M_1V_1$ and $C_1M_1$ respectively. Likewise, all other images must be reduced or enlarged to produce the picture $B_1A_1$, but it will be found that the distance between $c$ and $v$ is always equal to that between $C_1$ and $V_1$, Fig. 1.

Projection of the picture $ab$ to the equivalent of $B_1A_1$ is not possible by use of a lens at Z in the relation shown as $ab$ and $B_1A_1$ would not be conjugate focal planes. To project an oblique picture to the equivalent of one having a vertical lens axis, the focal planes of the projector lens must be conjugate and the horizon line H must be in the front focal plane of the projector lens for projecting the said line to an infinitely distant plane. Also the image plane must be parallel to the plane of rays from the horizon line through the projector lens in order that no image of the horizon line can be received.

It is possible to project oblique pictures so that the corrected reproductions will be larger or smaller than the original, but my projector is designed to produce correct pictures at the scale as would exist in the ideal plane $mT$. Such a picture is represented by $B_1A_1$ of Fig. 1 and may be considered as a unit enlargement relative to the scale of images in the line $m$, the line of no scale change, or true scale.

The theory on which my projector is based may be understood from the diagram of Fig. 2, and the proof of such relations or values of lines and angles as are mentioned in the following description can be readily established from the geometric construction of the diagram. To construct Fig. 2, draw all of Fig. 1 except that part below the plane $B_1A_1$, and the lines designated by $F_1$ and $F_2$. Prolong the oblique picture plane $ab$ and the horizontal plane $B_1A_1$ until they intersect at I. With a center at I and a radius $Im$ describe the arc passing through $m$ and $M_1$ and extend it a convenient distance to $m_1$. Draw the line $Im_1$ which represents the image plane that will receive the correct projection of $ab$. With same center I describe the arcs $B_1 b_1$, $V_1 v_1$, $C_1 c_1$, and $A_1 a_1$, thus transferring the ideal picture $B_1A_1$ to the image plane $Im_1$ at $b_1$, $v_1$, $c_1$, and $a_1$. Lines drawn from $a$ to $a_1$, $b$ to $b_1$, $c$ to $c_1$, etc., will all intersect at the point L and bisect the line $mm_1$. A line drawn from I perpendicular to $mm_1$ at L bisects the angle $m\,Im_1$, and a line from H perpendicular to $mL$ at S bisects the line $mL$ and the angle $mHL$, therefore all angles designated by $\alpha$ are equal.

The point L is the position of the projector lens and its optical axis is the line $mm_1$. If its focus be represented by $f$, lines $mL$ and $Lm_1$ will each equal $2f$, thus fulfilling the optical requirement for unit enlargement of $m$ at $m_1$. Since SL equals $f$, the horizon line H is in the front focal plane HS of the lens and its image will be formed at infinity. Furthermore the plane of rays HL is parallel to the picture plane $Im_1$ which can receive no rays from the horizon line through the lens.

It is obvious that if a lens of longer focus is selected, the chord $mm_1$ and the angle $mIm_1$ will increase. Also the position of the lens L will change; but regardless of its focal length the lens will always lie in a circle passing through $m$, Z, L and I and having its center at the horizon line H. Therefore the angle $\alpha$ of the projector planes will vary as $f$ the focus of its lens and, as determined from Fig. 2, its value may be expressed by the equation:

$$\sin \alpha = \frac{f}{F} \sin \theta$$

In a picture the point $c$ on Figs. 1 and 2 is where the optical axis of the camera intersects the focal plane, and can be located on all pictures. But while points $v$ and $m$ actually exist, their positions are not known. The distance $cm$ varies as the angle $\theta$ and it is the amount of shift or displacement given to the true scale line $m$ of each picture as the planes are tilted. If the amount be expressed by $\Delta$ its value may be found from the equation:

$$\Delta = F \tan \frac{\theta}{2}$$

Briefly, in Fig. 2, the planes $ab$ and $b_1a_1$, the lens L and its optical axis $mm_1$ represent the relative positions of the focal planes and optical system of my projector during the correction of a picture $ab$. When not tilted the planes are parallel to each other and normal to the optical axis, as indicated by X and Y. To correct a picture the planes are brought to the parallel positions and the picture $ab$ is placed in the object plane X with its point $c$ on the axis $mm_1$ and with its tilt axis parallel to the tilt axis of plane X. As the planes are tilted to the positions of $ab$ and $b_1a_1$ the slides of both planes shift the same amount $\Delta$ toward I. The line of true scale $m$ will now lie in the tilt axis of the object plane, and the point of the image plane that lay in the optical axis will now lie in the position of image $v_1$.

The images and their relative distances from the line $m$ have been correspondingly enlarged or reduced in size as required to correct the tilted picture. For instance in Fig. 2 the size of $b_1$, the corrected image of $b$, may be found from the equation:

$$b_1 = \frac{bf}{f + b \sin \alpha}$$

and the size of $a_1$, the corrected image of $a$, may be found from the equation $$a_1 = \frac{af}{f - a \sin \alpha}$$

The letters $a$, $a_1$, $b$ and $b_1$ in the two equations may also represent the distances of said image points from $m_1$ and $m$ in their corresponding planes.

In the foregoing description of the theory it is assumed that the two nodal points of the lens lie in a single point. Usually the nodal points overlap or do not meet, but the rays diverging from the points make the same angle as if at a single point. Therefore in Fig. 2 the distances between the tilt axes at $m$ and $m_1$ will be equal to four times $f$, the focus of the lens, plus the nodal separation if they do not meet, or minus the nodal point separation if they overlap.

As shown in Figs. 3 to 11, my projector has a base E supporting two pairs of uprights J and $J_1$, respectively, that are further supported by diagonal braces $J_2$ and $J_3$ and tied together at the top by beams $J_4$ and $J_5$. Two tilting frames R and $R_1$ turn on spindles $R_2$ and $R_3$ in bearings $R_4$ and $R_5$ on the base and in bearings provided in the top beams $J_4$ and $J_5$.

The axes Q Q and $Q_1$ $Q_1$, Fig. 3 of the tilting frames R and $R_1$ respectively, are parallel to each other in the same vertical plane and separated by a fixed distance equal to the algebraic sum of the distance between the nodal points of the lens L and four times its focal length.

Figure 6:
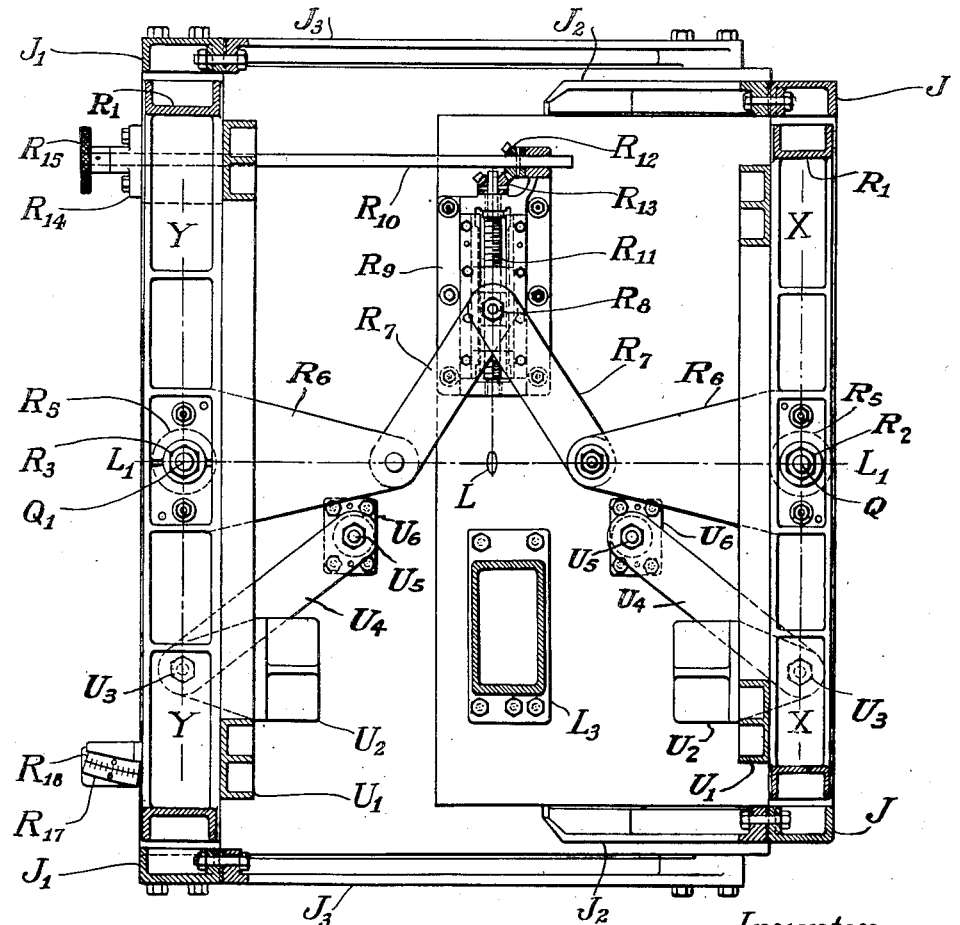
Fig. 6 is a plan view as would appear if that part above section line 2—2 Fig. 3 were removed.

Two equal tilting levers $R_6$, Fig. 6, are fastened to the bottoms of the tilting frames and are connected to the vertical pivot $R_8$ by means of two equal links $R_7$. The pivot $R_8$ is attached to the nut that fits the screw $R_{11}$ and is compelled by the ways of bracket $R_9$ to slide horizontally in a vertical plane that is perpendicular to the plane containing the two tilt axes Q Q and $Q_1$ $Q_1$ and equidistant from each of said axes.

A shaft $R_{10}$ mounted in a bracket $R_{14}$ on the base E is geared to the screw 11 thru bevel pinions $R_{12}$, $R_{13}$, and carries a hand wheel $R_{15}$. It is apparent that sliding motion imparted to the stud $R_8$ by means of the wheel $R_{15}$, the shaft $R_{10}$, the gears $R_{12}$ and $R_{13}$ and the screw $R_{11}$ will cause the equal links and equal levers to turn the frames R and $R_1$ through equal but opposite angles, as indicated by the schematic drawing of Fig. 7.

The lens pedestal $L_3$ is secured to the base E and has mounted thereon a bracket $L_2$ carrying the lens L. The bracket $L_2$ is so positioned on and secured to the pedestal that the lens axis $L_1$ $L_1$ is in the same vertical plane with the two tilt axes and perpendicular to said axes and also so that the first and second nodal points of the lens are twice its focal distance from the tilt axes Q Q and $Q_1$ $Q_1$ respectively, Fig. 3.

Two displacing slides, U and $U_1$ travel on two rollers $U_{11}$ attached by adjustable means to the bottom members of the tilting frames R and $R_1$, respectively, and their sliding surfaces are held in contact with said tilting frames by means of gibs $U_{12}$. As shown in Fig. 13, the rollers $U_{11}$ are free to rotate on spindles $U_{13}$ fastened at one end of arms $U_7$ that pivot at the other end on the studs $U_{10}$. The free ends of said arms are supported by the adjusting screws $U_9$ in the nuts $U_8$ that are rigidly fastened to the tilting frames. Turning of the screws $U_9$ will rotate the arms $U_7$ on studs $U_{10}$ and raise or lower the free end of said arms and thereby adjust the rollers $U_{11}$ so that the bearing surfaces of the slides U and $U_1$ will travel in planes perpendicular to the tilt axes Q Q and $Q_1$ $Q_1$; in which position the studs $U_{10}$ and the lock nuts of $U_9$ are securely fastened.

Two displacing brackets $U_2$ are fastened at the bottom of their respective displacing slides and extend under the tilting frames to support the pivots $U_3$ in the focal planes X X and Y Y that lie in the tilt axes Q Q and $Q_1$ $Q_1$ respectively. Two radial arms $U_4$ of equal length are connected on one end to their respective pivots $U_3$ and at the other ends to pivots $U_5$ that are secured to the base E by the blocks $U_6$, Fig. 6.

Figure 7:
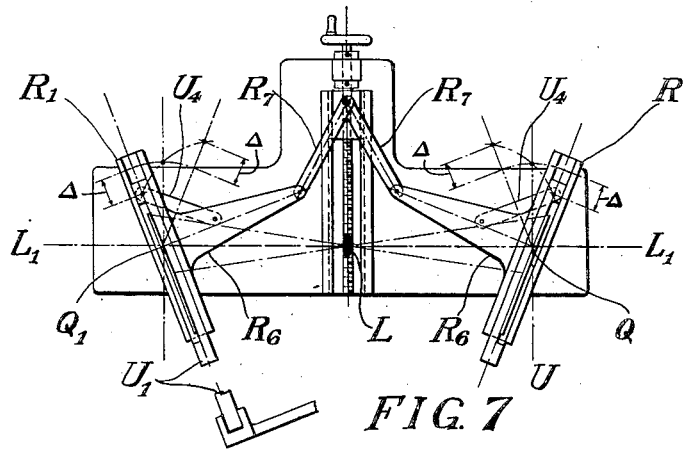
Fig. 7 is a schematic diagram showing the system of links for tilting the planes and shifting the slides.

By turning the wheel $R_{15}$ the tilting mechanism will rotate the two tilting frames with the two displacing slides, and simultaneously the displacing arms $U_4$ will compel the said slides U and $U_1$ to shift through the amount Δ, Fig. 7, toward the intersection of the extended tilted planes. Tilting and displacing in opposite directions are effected by counter rotation of the hand wheel $R_{15}$.

The length of the radial arms $U_4$ and the positions of pivots $U_3$ and $U_5$ relative to the tilt axes are fixed so that when the planes are tilted the displacement Δ of the slides will be correct for any angle of tilt α and is expressed in the relation:

$$\Delta = \frac{f(1-\cos\theta)}{F \sin \alpha} = F \tan \frac{\theta}{2}$$

in which $f$ and $F$ are the foci of the projector lens and camera lens, respectively, and $\theta$ is the tilt in the oblique picture. Said distance Δ corresponds to $cm$ and $v_1 m_1$ of Fig. 2.

Theoretically, the curve generated by the pivot $U_3$ is not the arc of a circle but for angles up to 7 degrees, which greatly exceeds the tilt of aerial pictures, the errors introduced by the simple radial construction of Figs. 6 and 7 are negligible.

As shown in Fig. 10, the slides U and $U_1$ may also be accurately displaced by a tangential lever mechanism in conjunction with the same tilting mechanism of Fig. 6. The arms $W_1$ are fastened to the slides U and $U_1$ and connected by pivot studs $W_2$ to the sliding blocks $W_3$ that slide between parallel ways $W_4$. The arms $W_1$ may conveniently be fastened to the respective slides $U_1 U_2$, thru bolts or screws, $W_5$ which pass thru slots $W_6$ in said arms, whereby said arms may be adjusted with respect to the slides and secured by said bolts in adjusted position. The arms $W_1$ are adjusted so that their respective pivots $W_2$ are equidistant from Q and $Q_1$, and fastened in position. When the tilting frames R and $R_1$ are parallel to each other and perpendicular to the optical axis $L_1 L_1$, the tilt axes $Q_1 Q_1$ and Q Q, the pivots $W_2$ and the link pivots of $R_6$ will all be in the same vertical plane with the optical axis. As the frames R and $R_1$ are tilted the arms $W_1$ compel the slides to move the amount Δ relative to the said frames, and the slide blocks $W_3$ permit tilting by sliding towards the lens in the ways $W_4$.

If the distance $W_2 Q_1$ or $W_2 Q_1$ Fig. 11, be expressed by ω the displacement Δ due to the various angles α will be:

$$\Delta = \omega \tan \alpha$$

Theoretically, the displacement Δ will not be correct for all angles α if the distance ω is constant, but the tilt angles θ in aerial mapping pictures are usually less than one degree and rarely exceed three degrees. Therefore the errors in Δ produced by constant distances ω are insignificant. For instance, if the arms $W_1$ are set at the correct length ω for Δ when α equals 3 degrees and the lens ratio $$\frac{f}{F}$$

is .7304, the errors in Δ when α equals 30 minutes and α equals 6 degrees will be .000011 inch and .00007 inch, respectively. When α is 6 degrees the tilt angle $\theta$ in the aerial picture will be 8½ degrees.

Two rotators G and $G_1$ of L shaped section are held in contact with their respective slides U and $U_1$ by gibs $G_{10}$ and rotate on two sets of equalizing roller bearings attached by adjusting means to said slides. As shown in Fig. 12 the rollers $G_7$ turn on spindles $G_9$ in blocks $G_2$ that swivel on shaft $G_6$ in one end of the radial arm $G_4$. Said radial arm is supported at one end by the pivot stud $G_5$ and at the other end by the adjusting screw $G_8$ in the nut $G_3$ rigidly fastened to the displacing slide.

To adjust the rotators into their correct positions, the frames R and $R_1$ are first set parallel to each other, in which case the said frames, their slides and respective focal planes X X and Y Y will be perpendicular to the optical axis $L_1 L_1$. A vernier comprising graduated members $R_{17}$, $R_{18}$, mounted respectively on the base E and tilting frame $R_1$, denotes the angular positions of said focal planes; the focal planes aforesaid being perpendicular to the optical axis $L_1 L_1$ when the vernier reading is zero. By means of the screws $G_8$ the rotators are then adjusted so that their axes of rotation coincide with the said optical axis. The radial arms $G_4$ are then clamped to their respective displacing slides by tightening the studs $G_5$, and the adjusting screws fastened by means of their lock nuts. Because of the equal distance of the two spindles $G_9$ from the pivot shaft $G_6$ in the swivel blocks, the total load of the rotators is distributed equally to each roller, and the axes of the rotators are maintained accurately in position. These features, as well as the convenient method of accurate adjustment, constitute important improvements in projectors.

Two ring gears $G_{12}$ and $G_{13}$ are fastened to the rotators $G_1$ and G respectively and both are operated from the image end, or viewing end of the projectors as shown in Figs. 3 and 4. The gear $G_{13}$ Fig. 3, on the rotator G meshes with a pinion $G_{14}$ keyed to the shaft $P_{16}$ that turns in its bearing in slide U and is connected to the hollow shaft $P_{17}$ by a universal coupling. The shaft $P_{19}$ of the operating wheel $P_{20}$ turns in a bearing in the top beam $J_5$ and is connected by a universal coupling to the shaft $P_{18}$ that is provided with a key way to fit the key in the bore of the hollow shaft $P_{17}$. The sliding motion relative to shafts $P_{17}$ and $P_{18}$ compensates for the change in distance between the shafts $P_{16}$ and $P_{19}$ during the tilting of the frame R, and also allows the shaft $P_{16}$ to be shifted longitudinally to bring bevel gear $P_{15}$ in mesh with bevel gear $P_{10}$, Figs. 3 and 9.

A clamp $G_{18}$, supported with freedom of motion on two studs in the slide U and extending over the gib flange of the rotator G, is provided with a tapped hole for the threaded end of shaft $G_{19}$ that has its bearing in slide U and is connected by means of universal couplings and the telescoping shafts $G_{20}$ and $G_{21}$ to the operating shaft $G_{22}$ in the upright $J_1$. By turning the hand-wheel $G_{23}$ of the operating shaft $G_{22}$, the rotator G may be locked to the slide U at will.

The ring gear $G_{12}$ of the image plane rotator meshes with a pinion $G_{31}$ (Fig. 16) mounted on the same shaft $G_{27}$ with a worm gear $G_{28}$ in the gear box $G_{15}$ that is mounted on a swivel block $G_2$, Figs. 4 and 16. Fast and slow rotation is imparted to the rotator $G_1$ by the hand-wheels $G_{17}$ and $G_{16}$ respectively, and the rotator may be locked to the slide $U_1$ by means of the clamp screw $G_{25}$. The shaft $G_{27}$ is slidable in the gear box or housing $G_{15}$ and has secured thereto a key $G_{32}$ which fits into a keyway in gear $G_{31}$. The latter is, as shown in Fig. 16 maintained by housing $G_{15}$ and block $G_2$ against sliding movement with shaft $G_{27}$. The handwheel $G_{17}$ is fastened to the shaft $G_{27}$, and rotation may thus be imparted to gear $G_{12}$ and rotator $G_1$ by simply turning said handwheel and thereby rotating the gear $G_{31}$. The worm gear $G_{28}$ is loosely mounted on shaft $G_{27}$ and is held by the housing $G_{15}$ against lateral shifting, as is apparent from Fig. 16. Said worm gear $G_{28}$ meshes with a worm on the shaft $G_{29}$ upon which the handwheel $G_{16}$ is mounted. Also, the hub of the worm gear $G_{28}$ is provided with clutch teeth adapted to be engaged by similar teeth on the hub of handwheel $G_{17}$, as shown. When it is desired to operate the rotator $G_1$ by the hand-wheel $G_{16}$ the handwheel $G_{17}$ is pushed inwardly, engaging its clutch teeth with those of the worm gear $G_{28}$, whereby said gear is clutched to the shaft $G_{27}$; and upon then turning the handwheel $G_{16}$ the shaft $G_{27}$, gear $G_{31}$ and rotator $G_1$ are actuated thru said worm gear $G_{28}$. Through turning of the handwheel $G_{17}$ the rotator $G_1$ may be rapidly rotated approximately into its desired position, and then, through handwheel $G_{16}$, fine degrees of adjustment may be imparted to said rotator to bring the latter with exactness and precision into its proper position. A graduated circle $G_{26}$ is mounted on the gear $G_{12}$ and is concentric with the axis of $G_{12}$. Angular rotation is measured relative to the vernier $G_{24}$ that is mounted on the displacing slide $U_1$.

The frame K, which is the abscissa slide or parallax slide, is held in contact with the rotator $G_1$ by means of four gibs $K_2$ and is guided between two pairs of adjustable roller bearings $K_1$ fastened to the rotator $G_1$, Fig. 4. The roller bearings are of the same design as described in Fig. 13 and are adjusted so that their bearing surfaces on the slide K will be in parallel planes perpendicular to the tilt axis $Q_1 Q_1$ when zero of the dividing circle $G_{26}$ is set at zero of the vernier $G_{24}$. It is obvious in Fig. 4 that the direction of motion of said parallax slide will be different for each angular position of the rotator $G_1$.

Motion to the right or left is imparted to the slide by means of a hand-wheel and shaft $K_5$ connected by two spiral gears in the box $K_6$ to the shaft $K_7$ that has its threaded end in the nut $K_8$ on the slide K, Fig. 4. Said slide is stopped in its neutral position when its pivotally mounted gag $K_3$ is in contact with the screw $K_4$ in a nut bolted on the rotator $G_1$. When the gag is lifted on its pivot free of screw $K_4$, travel to the right as well as to the left of the neutral position is permitted, and the amount of travel is measured by the micrometer dial $K_{21}$ on the rotator $G_1$ which dial is operated by bar $K_{22}$ attached to slide K.

As shown in Fig. 4, four gibs $K_{13}$ retain a frame-shaped ordinate slide $K_9$ on surfaces provided on two sides of the parallax slide K. Sliding motion perpendicular to that of the parallax slide is imparted by the screw attached to the hand-wheel $K_{12}$ and is measured by means of a micrometer dial $K_{19}$ operated by a contact bar $K_{20}$. A pivotally-mounted gag $K_{10}$ is provided to locate the neutral position of the ordinate slide $K_9$.

Figure 8:
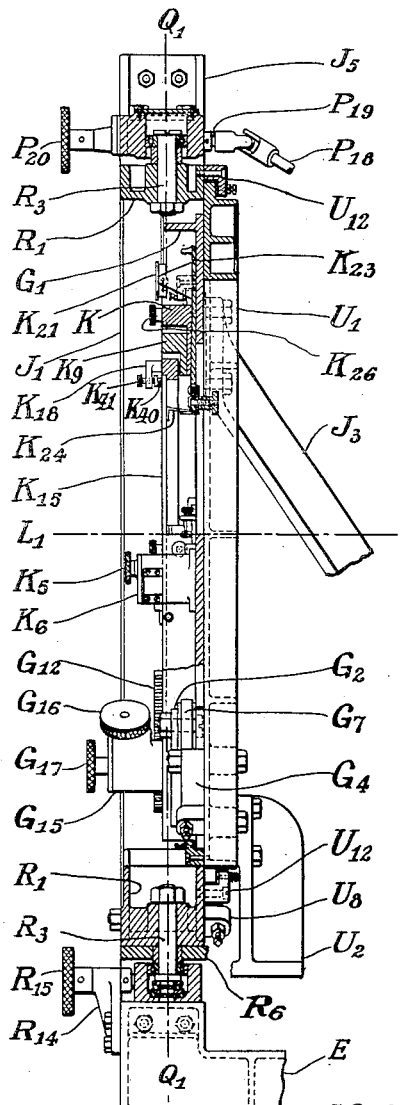
Fig. 8 is a sectional view on line 8—8, Fig. 4, showing the image plane mechanism.
Figure 9:
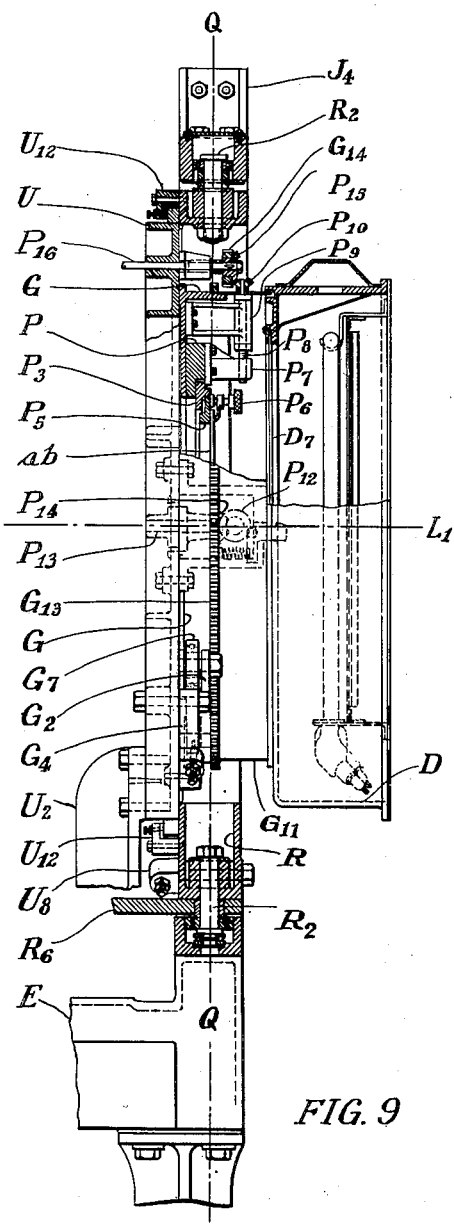
Fig. 9 is a sectional view on line 9—9, Fig. 5, showing the object plane mechanism and light house.

A glass screen $K_{15}$ is securely fastened in a frame $K_{14}$ and is provided on its ground surface with two sets of equally spaced parallel lines; said sets of lines intersect at right angles and form a grid of equal squares, Fig. 4. The frame and glass constitute a unit that is mounted on the screws $K_{16}$ in the ordinate slide $K_9$ with the ground surface of the glass $K_{15}$ facing the lens L, Fig. 8, and is held in said ordinate slide by means of the swivel clamps $K_{18}$ and the hand screws $K_{17}$. The grid frame $K_{14}$ is provided with adjustable screws, $K_{40}$ (Fig. 8), similar to $N_7$ on the plate holder of Fig. 14, the heads of which screws are engageable by screws $K_{41}$ in the clamps $K_{18}$ as shown in Fig. 8. Said screws $K_{40}$ are adjusted so that the ground surface of the grid screen $K_{15}$ will be maintained in the focal plane Y Y, Fig. 6, that also contains the tilt axis $Q_1 Q_1$, Fig. 4.

To adjust the grid into its correct position relative to the ordinate slide $K_9$, it is first necessary to set the rotator $G_1$ and the focal planes X X and Y Y at their zero positions, which will be indicated by their verniers $G_{24}$ and $R_{18}$ respectively, Figs. 4 and 6. By means of the hand-wheels $K_5$ and $K_{12}$ the slides K and $K_9$ are moved until stopped by their respective gags $K_3$ and $K_{10}$. The parallax and ordinate slides will then be in their neutral positions and by means of screws $K_{16}$ the grid is adjusted so that the intersection $K_{27}$ of the two main grid lines is in the common axis of the rotator $G_1$ and the lens L and the main vertical grid line is in the tilt axis $Q_1 Q_1$. The screws $K_{16}$ are then locked, and the grid and its frame as a unit can be removed from the projector and replaced again at will without further adjustment. It is obvious that relative to the ordinate slide $K_9$ the grid will be in its correct position regardless of the rotation of G or of tilt given to the focal plane.

In Fig. 4 the large spacing of the grid lines is shown to avoid the confusion that a greater number of lines would cause. The space between the lines should preferably be a little less than the movement of the slides K and $K_9$ and the minimum thickness of each gag should preferably be a little more than half the line spacing. For lines .500 inch apart, .300 inch travel of the slides K and $K_9$ each side of their neutral position will be ample to measure distances between any points projected on the grid screen. Since the projected image does not move, the screen on which it appears can be moved relative to the image.

To measure the distance of point $a$ from the main vertical grid line, the gag $K_3$ is lifted and by means of the hand-wheel $K_5$ the parallax slide is moved to the right until the line $K_{28}$ is on the point. The distance moved is read in thousandths of an inch on the dial $K_{21}$ and added to the distance represented by the number of equally spaced lines from said main vertical line. By using the ordinate slide $K_9$ the distance of same point from the main horizontal line can be measured. To measure the distance between the points $a$ and $b$ the rotator $G_1$ is rotated until a line now horizontal, Fig. 4, lies equidistant from both points, as will be determined by the ordinate slide $K_9$; by means of the parallax slide and the indicator dial the distances of $a$ and $b$ from their nearest lines are measured separately, and the algebraic sum of said distances plus the sum of the equal spaces between said nearest lines will be the distance between the points. The measuring between two such points can be effected in a few seconds and with accuracy within .001 of an inch. In Fig. 4, it is obvious that due to the rotator the same measurements can be made by either the ordinate or the abscissa slide.

Figure 17:
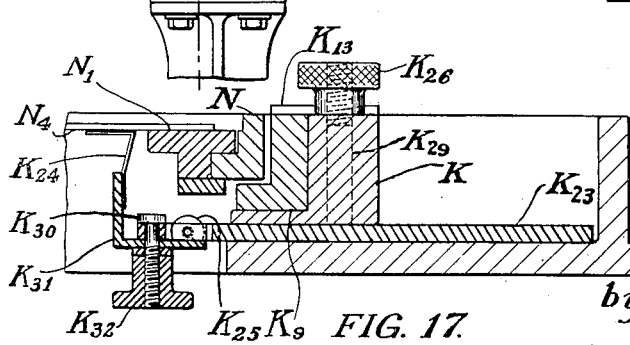

The parallax slide K is provided with grooves to receive four bars $K_{23}$ that can be extended towards the center of the grid and clamped in adjusted position by any suitable means such as bolt $K_{29}$ (Fig. 18), on a shaft having a threaded upper end which carries a nut $K_{26}$. As shown in Figs. 17 and 18, each of the bars $K_{23}$ may be provided with a groove into which the associated bolt $K_{29}$ extends. Turning of the nut $K_{26}$ either loosens or tightens the engagement of bolt $K_{29}$ with the grooved portion of the bar and thus permits said bar to be shifted to a desired position and clamped firmly in the position to which it is adjusted. A target $K_{24}$ containing a small hole near the end is mounted near the end of each bar so that the portion of said target containing said hole is just in contact with the ground surface of the grid. The target $K_{24}$ may be conveniently fastened to an angle bracket $K_{31}$ which is pivotally mounted on the screw $K_{30}$ on the bar $K_{23}$. A nut $K_{32}$ serves to hold the bracket $K_{31}$ in position on said pivot screw $K_{30}$. Said bracket may be adjusted to different positions about its pivot through screw $K_{25}$ which is mounted in bar $K_{23}$ and which bears against a projection on said bracket as shown in Fig. 18. A spring $K_{33}$ bears against the opposite side of said projection. Through the screw $K_{25}$ in cooperation with the spring $K_{23}$ a micrometer adjustment of bracket $K_{31}$ is provided, whereby the hole in the target $K_{24}$ may be brought into exact coincidence with one of the main lines on the grid screen. After the targets $K_{24}$ have been so adjusted as to bring their holes into coincidence with the main grid lines and a sensitized photographic plate is substituted for the grid and exposed to the image projected by the lens L, the images of said holes will appear on said plate, for a purpose which will be described hereinafter.

The grid may be removed and substituted by a plate receiver N, Fig. 14, on which a sensitized plate $N_4$ held by clamps $N_5$ is exposed to the image projected by the lens. The stops $N_7$ are adjusted so that the surface of the rotator $N_1$ in contact with the sensitized surface of the plate is in the focal plane Y Y, Fig. 6. Said rotator $N_1$ is provided so that the plate may be rotated to receive the image of the picture in a position similar to that which it assumes in the object plane X X of the projector, Fig. 6. The receiver N is mounted with its bearing plates $N_6$ on the screws $K_{16}$ and $K_{17}$ of the ordinate slide $K_9$ and retained by the several clamps $K_{18}$. Grips $N_8$ are provided for convenient handling.

A frame $P_3$, Fig. 5, is retained by gibs $P_4$ and slides in another frame P that travels against the surface of rotator G in the direction permitted by the retaining gibs $P_2$. Another frame $P_5$ is provided with picture clamps $P_6$ and is fastened to frame $P_3$ so that the surface in contact with picture $a\ b$, Fig. 9, will lie in the focal plane X X containing the tilt axis Q Q.

The frame P is provided with a nut $P_7$ for the screw shaft $P_8$ that is mounted in the bearing bracket $P_9$ and has a bevel gear $P_{10}$ meshing with a bevel pinion $P_{15}$ on the shaft $P_{16}$. Rotation of shaft $P_{16}$ by means of hand-wheel $P_{20}$ and its connecting elements, Fig. 9, will when pinion $P_{15}$ is in mesh with gear $P_{10}$, raise or lower the frame P.

Similar operating elements consisting of a nut $P_{11}$, screw shaft $P_{13}$, meshing gears $P_{12}$ and $P_{14}$, Fig. 5, are connected through telescoping shafts and universal joints similar to $P_{16}$—$P_{19}$, previously described, to a hand-wheel $P_{21}$, Fig. 4, for imparting motion to the plate slide $P_3$. The nut $P_{11}$ is mounted in a slide to permit vertical motion of $P_3$ as it travels with the plate slide P. The coordinate motion of the two sliding frames P and $P_3$ permits of adjusting the picture center into the common axis of the rotator G and of the lens L as indicated by $P_1$, Fig. 5.

A light house D provided with a suitable light source and a diffusing glass $D_7$ pivots on two bolts $D_2$ in the hinge brackets $D_1$ that are bolted to the displacing slide U, Fig. 3. A guard $G_{11}$ that has two holes for the two projecting bevel gears of the plate slides P and $P_3$ is fastened to the rotator G, Fig. 9, and rotates in a circular groove in the light house so as to prevent light leakage during the operation of the projector.

Mounting the light house on the displacing slide is a desirable feature as the picture projected will always be centrally located relative to the light area of the diffusing glass.

To simplify the description of operation of the projector, let it be assumed that the direction and amount of tilt of a picture $a\,b$ is known and it is desired to project it so that its reproduction will be a horizontal equivalent. The picture center $c$, Fig. 1, where the optical axis intersects the plane of the picture is discernible and marked on the picture.

By means of hand-wheels $R_{15}$ and $G_{16}$ the focal planes and the rotator $G_1$ respectively are set to register zero on their verniers $R_{18}$ and $G_{24}$, Fig. 4. By turning the hand-wheels $K_5$ and $K_{12}$ the coordinate slides K and $K_9$ are shifted to their neutral positions against their respective interposed gags in which position the grid point $K_{27}$ will be on the axis of the lens as well as the axis of the rotator $G_1$. The lamp-house is unlatched and swings on its hinges, and the rotator G is rotated to its position of Fig. 5 so that the bevel gears $P_{12}$ and $P_{15}$ can be meshed with their respective plate slide gears by means of the sliding provisions of their shafts. The picture $a\,b$ is then fastened by clamps $P_6$ with its emulsion surface against the frame $P_5$. The light house is closed and the rotator G is clamped by hand-wheel $G_{23}$ on the viewing end of the projector, Fig. 4. The image of the picture can be seen on the grid screen and by means of hand-wheels $P_{20}$ and $P_{21}$ the picture is adjusted until its center $c$ coincides with the intersection $K_{27}$ of the main grid lines. The picture center will now be on the lens axis and the center of rotation $P_1$ of the rotator G, Fig. 5.

From the rear of the projector the two bevel gears are thrown out of mesh and the rotator pinion $G_{14}$ is meshed with its gear $G_{13}$ on the rotator G.

Suppose that the tilt axis of the picture is parallel to a line that is 25 degrees from a line, not shown, connecting the picture center $c$ and a certain image point near a border of the picture $a\,b$. The rotator $G_1$ is turned until its vernier $G_{24}$ reads 65 degrees in which case the horizontal grid lines will then incline 25 degrees towards the vertical tilt axis $Q_1 Q_1$. The grid rotator $G_1$ is clamped by screw $G_{25}$ and by means of the hand-wheel $P_{20}$ the picture is rotated until the border point falls on the main horizontal grid line, which has been turned 65 degrees. The tilt axis of the picture $a\,b$ is now parallel to the tilt axis Q Q. By means of the wheel $R_{15}$ both planes of the projector are tilted through angle $\alpha$ and simultaneously both displacing slides will shift towards their line of intersection, as indicated by I of Fig. 2. The picture center $c$ and the grid center $K_{27}$ now lie in points $c$ and $v_1$ respectively as indicated in Fig. 2 and the true scale line $m$ will lie in the axis Q Q.

The grid may be now rotated on its axis and measurements of any points may be made by means of the coordinate slides, as the image of the picture $a\,b$ will not move.

The said coordinate slides K and $K_9$ are then brought to their neutral positions determined by their gags $K_3$ and $K_{10}$, respectively, and the targets $K_{24}$ adjusted and clamped so that their tiny holes are on the main grid lines. The clamps $K_{18}$ and the screws $K_{17}$ are unfastened so that the grid screen can be replaced by the plate receiver N; the targets $K_{24}$ remaining undisturbed. The rotator $N_1$ is turned so as to coincide with the borders of the picture, and a sensitized plate is clamped on the surface of $N_1$ and then exposed to the projected image of $a\,b$.

After development the images of the small holes will appear on the new picture and the intersection of the two lines connecting these points will be the image $v$ of the foot point V in the vertical through the lens of Fig. 1.

When it is desired to correct a pair of stereoscopic or overlapping aerial photographs of unknown tilt so that they will be the equivalents of horizontal photographs taken from the same view points as the respective tilted views, two of my projectors are employed, one for each of said views, and the procedure set forth in my application hereinbefore referred to is followed. This procedure comprises computing the parallaxes of salient image points, occurring in both views of the pair, with respect to horizontal views. The photographs are then placed in the respective duplicate projectors and the pictures are tilted about such axes and through such angles as will displace the salient image points in such amounts and direction that their parallaxes will agree with the aforesaid computed parallaxes. The parallax or abscissa slide K, together with the grid lines on the screen $K_{15}$ provides for ready measurement of the parallaxes of the salient points; while through the ordinate slide $K_0$, in conjunction with said grid screen, the ordinates of said points may be measured. The process of correcting such views being fully described in my application above mentioned, a detailed description thereof will not be here included; it being sufficient to note for the purpose of the present application that in the carrying out of said process my projector apparatus herein disclosed may be employed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for projecting tilted aerial photographs to their horizontal equivalents, said apparatus comprising a tiltable member for receiving an object to be projected, a tiltable member for receiving an image of said object, means for tilting said members, and means for shifting said members as an incident to their tilting movement in functional proportion to the amount of tilt and in equal amounts toward the intersection of their prolonged planes.

2. Apparatus for projecting tilted aerial photographs to their horizontal equivalents, said apparatus comprising a tiltable member for receiving an object to be projected, a tiltable member for receiving an image of said object and means for shifting the image receiving member in functional proportion to the angle of tilt thereof while maintaining the tilt axis thereof fixed.

3. Apparatus for projecting tilted aerial photographs to their horizontal equivalents, said apparatus comprising a tiltable member for receiving an object to be projected, a tiltable member for receiving an image of said object, and means comprising radial arms connected to said members for causing the latter to be shifted as an incident to their tilting movement in functional proportion to the amount of tilt and in equal amounts toward the intersection of their prolonged planes.

4. Apparatus for projecting tilted aerial photographs to their horizontal equivalents, said apparatus comprising a tiltable member for receiving an object to be projected, a tiltable member for receiving an image of said object, and means comprising a radial arm for causing the image receiving member to be shifted as an incident to tilting thereof and in functional proportion to the amount of tilt while the tilt axis thereof is maintained fixed.

5. Apparatus for projecting tilted aerial photographs to their horizontal equivalents, said apparatus comprising a tiltable member for receiving an object to be projected, a tiltable member for receiving an image of said object and means comprising tangential members connected to said tiltable members for causing the latter to be shifted as an incident to their tilting movement in functional proportion to the amount of tilt and in equal amounts toward the intersection of their prolonged planes.

6. Apparatus for projecting tilted aerial photographs to their horizontal equivalents, said apparatus comprising a tiltable member for receiving an object to be projected, a tiltable member for receiving an image of said object, and means comprising a tangential member connected to the image receiving member for shifting the latter as an incident to tilting thereof and in functional proportion to the amount of tilt while the tilt axis thereof is maintained fixed.

7. Apparatus for projecting tilted aerial photographs to their horizontal equivalents, said apparatus comprising an image receiving grid screen having one set of parallel lines of predetermined spacing intersecting another set of spaced parallel lines at right angles, means supporting said screen and adapted to effect rectilinear movement thereof, and means for measuring the extent of such movement.

8. Apparatus for projecting tilted aerial photographs to their horizontal equivalents, said apparatus comprising an image receiving grid screen having one set of parallel lines of predetermined spacing intersecting another set of spaced parallel lines at right angles, means for supporting said screen and adapted to effect rectilinear movement thereof in directions at right angles to each other, and means for measuring the extent of such movements.

9. Apparatus for projecting tilted aerial photographs to their horizontal equivalents, said apparatus comprising an image receiving grid screen having one set of parallel lines of predetermined spacing intersecting another set of spaced parallel lines at right angles, means supporting said screen and adapted to effect rectilinear movement thereof, and means controlled by said supporting means for measuring the extent of such movement.

10. Apparatus for projecting tilted aerial photographs to their horizontal equivalents, said apparatus comprising a tiltable member, an image receiving grid screen having one set of parallel lines of predetermined spacing intersecting another set of spaced parallel lines at right angles, and means carried by said member for supporting said screen and for effecting rectilinear movement thereof.

11. Apparatus for projecting tilted aerial photographs to their horizontal equivalents, said apparatus comprising a tiltable member, an image receiving grid screen having one set of parallel lines of predetermined spacing intersecting another set of spaced parallel lines at right angles, and means carried by said member for supporting said screen and for effecting rectilinear movement thereof in directions at right angles to each other.

12. Apparatus for projecting tilted aerial photographs to their horizontal equivalents, said apparatus comprising a tiltable member, an image receiving grid screen having one set of parallel lines of predetermined spacing intersecting another set of spaced parallel lines at right angles, means carried by said member for supporting said screen and for effecting rectilinear movement thereof, and means for measuring the extent of such movement.

13. Apparatus for projecting tilted aerial photographs to their horizontal equivalents, said apparatus comprising a tiltable member for receiving an object to be projected, a second tiltable member, means for tilting said members through equal angles, an image receiving grid screen mounted on said second tiltable member for rectilinear movement, and means for measuring the extent of such movement.

14. Apparatus for projecting tilted aerial photographs to their horizontal equivalents, said apparatus comprising a tiltable member for receiving an object to be projected, a second tiltable member, means for tilting said members concurrently through equal angles, an image receiving grid screen mounted on said second tiltable member for rectilinear movement, and means for measuring the extent of such movement.

15. Apparatus for projecting tilted aerial photographs to their horizontal equivalents, said apparatus comprising a pair of tiltable members, an element rotatably mounted on one of said members, an image receiving grid screen supported on said element for bodily displacement with respect thereto, and manually operable means for effecting such displacement.

16. Apparatus for projecting tilted aerial photographs to their horizontal equivalents, said apparatus comprising a pair of tiltable members, an element rotatably mounted on one of said members, an image receiving grid screen supported on said element for bodily displacement with respect thereto in directions at right angles to each other, and manually operable means for effecting such displacement.

17. Apparatus for projecting tilted aerial photographs to their horizontal equivalents, said apparatus comprising a member rotatable about an axis and tiltable about a single additional fixed axis for receiving an object to be projected, a second tiltable member, means operatively connected to said members for tilting the same and an image receiving grid screen mounted in one of said members and bodily displaceable with respect thereto.

18. Apparatus for projecting tilted aerial photographs to their horizontal equivalents, said apparatus comprising an image receiving screen and means for locating on said screen and indicating thereon to an observer the point where a vertical line through the camera lens intersected the aerial photograph at the instant of exposure.

19. Apparatus for projecting tilted aerial photographs to their horizontal equivalents, said apparatus comprising a tiltable member for receiving a projected image, and means operable as an incident to tilting of said member for locating and indicating thereon to an observer the image of the ground point which lay in a vertical line through the camera lens when the aerial photograph was exposed.

20. Apparatus for projecting tilted aerial photographs to their horizontal equivalents, said apparatus comprising a tiltable member for receiving an object to be projected, a tiltable member for receiving an image of said object, and means cooperating with said members for locating and indicating thereon to an observer the image of the ground point which lay in a vertical line through the camera lens when the aerial photograph was exposed.

21. Apparatus for projecting tilted aerial photographs to their horizontal equivalents, said apparatus comprising tiltable object and image receiving members, means operable as an incident to tilting of the object receiving member for bodily shifting the latter in functional proportion to tilting thereof while the tilt axis thereof is fixed, and means operable as an incident to tilting of the image receiving member for bodily shifting the latter in functional proportion to the tilt thereof while the tilt axis thereof is fixed.

22. Apparatus for projecting tilted aerial photographs to their horizontal equivalents, said apparatus comprising tiltable object and image receiving members, means for tilting said members, and means operable as an incident to tilting of said members for locating in the image receiving member and indicating to an observer the point where a vertical line through the camera lens intersected the aerial photograph at the instant of exposure.

23. Apparatus for projecting tilted aerial photographs to their horizontal equivalents, said apparatus comprising tiltable object and image receiving members, means for simultaneously tilting said members, and means operable as an incident to tilting of said members for locating in the image receiving member and indicating to an observer the point where a vertical line through the camera lens intersected the aerial photograph at the instant of exposure.

24. Apparatus for projecting tilted aerial photographs to their horizontal equivalents, said apparatus comprising tiltable object and image receiving members, and means for concurrently tilting said members and displacing the same in functional proportion to the angle of tilt thereof and in equal amounts toward the intersection of their prolonged planes.

25. Apparatus for projecting tilted aerial photographs to their horizontal equivalents, said apparatus comprising an image receiving grid screen, slides supporting said screen and shiftable for measuring ordinates and abscissæ of image points projected upon said screen, means for shifting said slides, and other means movable in said apparatus into and out of operative relation to said slides for stopping said slides in their neutral positions.

26. Apparatus for projecting tilted aerial photographs to their horizontal equivalents, said apparatus comprising an image receiving screen, screen supporting means shiftable in directions at right angles to each other for measuring ordinates and abscissæ of image points projected on said screen, means for shifting the first mentioned means, and other means interposable between the first mentioned means and said shifting means for stopping the first mentioned means in neutral position.

27. Apparatus for projecting tilted aerial photographs to their horizontal equivalents, said apparatus comprising a rotatable member, an image receiving grid screen, means carried by said member for shifting said screen from neutral position in directions at right angles to each other, and other means movable in said apparatus into and out of operative relation to said screen for locating said screen in neutral position.

28. Apparatus for projecting tilted aerial pictures to their horizontal equivalents, said apparatus comprising a lens and a member tiltable about a fixed axis perpendicular to the lens axis, a slidable member carried by said tiltable member, a rotatable member carried by said slidable member, a slidable element carried by said rotatable member, a slidable element supported on second mentioned slidable element, a removable image receiving grid screen supported in a predetermined position in the third mentioned slidable element and means for shifting said second and third mentioned slidable elements parallel to the respective lines on the grid screen to bring the intersection of the two main grid lines into coincidence with the axis of rotation of the said rotatable member.

29. Apparatus for projecting tilted aerial photographs to their horizontal equivalents, said apparatus comprising a lens, an element tiltable about a fixed axis having a given relation to the lens axis, a member carried by said element and rotatable about the axis of said lens when said element is in a certain position, an image receiving grid screen carried by said rotatable member, and means for shifting said screen to bring the intersection of its two main grid lines into coincidence with the axis of rotation of said rotatable member.

30. Apparatus for projecting tilted aerial photographs to their horizontal equivalents, said apparatus comprising a lens, a member tiltable about a fixed axis having a given relation to the lens axis, an image receiving grid screen, elements shiftable in directions at right angles to each other and supporting said screen, said elements being carried by said tiltable member, and members shiftable into and out of position for limiting movement of the respective elements.

31. Apparatus for projecting tilted aerial photographs to their horizontal equivalents, said apparatus comprising a lens, an image receiving frame tiltable about a fixed axis having a given relation to the lens axis, a slide shiftable thereon, a rotatable member carried by said slide, an image receiving grid screen, and means on said rotatable member supporting said screen for movement in directions at right angles to each other.

32. Apparatus for projecting tilted aerial photographs to their horizontal equivalents, said apparatus comprising a lens and an image receiving frame tiltable about a fixed axis having a given relation to the lens axis, a rotatable member carried thereby, a slidable element supported by said member, an element mounted on said first mentioned element for sliding movement in a direction at right angles to the direction of movement of the first mentioned element, an image receiving grid screen mounted on the second mentioned slidable element, a stop shiftable into and out of position for limiting movement of the first mentioned element, and a stop shiftable into and out of position for limiting movement of the second mentioned element, said stops being adapted to determine neutral positions of the respective slides.

33. In a projecting apparatus, a lens, a tiltable member, a rotatable member carried by said tiltable member, an image receiving screen carried by said rotatable member, means for positioning said tiltable member at right angles to the axis of said lens, and independent means for adjusting said rotatable member to bring its axis of rotation into coincidence with said lens axis.

34. In a projecting apparatus, tiltable object and image receiving elements, a lens, rotatable members carried by the respective elements, means for tilting said elements simultaneously, and independent means for adjusting said members individually to bring their axes of rotation into coincidence with the axis of said lens.

35. In a projecting apparatus, tiltable object and image receiving members, and means for tilting said members simultaneously through equal angles and shifting them through equal distances concurrently with said tilting.

36. In a projecting apparatus, tiltable object and image receiving members, arms of equal length rigidly connected to said members, links of equal length connected to said arms, and means comprising a screw connected to said links for simultaneously tilting said members.

37. In a projecting apparatus, tiltable object and image receiving members, and means comprising a screw common to said members for simultaneously tilting the same through equal angles and causing linear displacement thereof through equal amounts.

38. In a projecting apparatus, a tiltable object frame, a slide carried thereby for supporting an object to be projected, and a lighting means mounted for movement corresponding in amount and direction with that of said slide.

39. In a projecting apparatus, a tiltable object frame, a slide carried thereby for supporting an object to be projected, and a lighting means supported by said slide.

40. In a projecting apparatus, a tiltable object frame, a slide carried thereby, a rotatable member carried by said slide for supporting an object to be projected, and a lighting means supported by said slide.

41. In a projecting apparatus, a tiltable object frame, a slide carried thereby, a rotatable member carried by said slide for supporting an object to be projected, a housing for a light source, said housing being supported by said slide, and annular means on said rotatable member and cooperating with similar annular means on said housing for preventing leakage of a light between said rotatable member and said housing.

42. In a projecting apparatus, a tiltable object frame, a slide carried by said object frame for supporting an object to be projected, a light housing pivotally supported by said slide.

43. In a projecting apparatus, a rotatable member having gear teeth on its periphery, an image receiving screen supported by said member, a bearing element for said member, a pivoted arm carrying said element, means for varying the position of said arm, and a gear mounted on said element and meshing with the gear teeth on said member.

44. In a projecting apparatus, a rotatable member, an image receiving screen supported by said member, a bearing element for said member, means for shifting said element for adjusting the position of said member, and means mounted on said element for rotating said member.

45. In a projecting apparatus, a rotatable member having gear teeth on its periphery, an image receiving screen supported by said member, a bearing element for said member, means for shifting said element for adjusting the position of said member, and a gear mounted on said element and meshing with the gear teeth on said member.

46. In a projecting apparatus, a support, a frame tiltable in said support about a fixed axis, a rotatable member carried on said frame, an image receiving screen supported by said member, manipulative means for rotating said member, and other manipulative means for causing rotation of said member at a different rate from the first manipulative means.

47. In a projecting apparatus, a support, a frame tiltable in said support about a fixed axis, a rotatable member carried on said frame, an image receiving screen supported by said member, said member having gear teeth on its periphery, a manipulative member geared to said teeth for rotating said member, and a second manipulative member geared to said teeth for imparting rotation thereto at a different rate from the first manipulative member.

48. In a projecting apparatus, an object receiving means comprising a rotatable member, a slidable element on said rotatable member adapted to support an object to be projected, means comprising a rotatable and slidable shaft for imparting rotation to said member, a support having bearing means for said shaft, and means engageable by said shaft for imparting rectilinear movement to said element.

49. In a projecting apparatus, an object receiving means comprising a rotatable member, an element movably mounted on said member and adapted to support an object to be projected, means shiftable to one position for rotating said member and to another position for shifting said element with respect to said member, and bearing means in which the first mentioned means is mounted.

50. In a projecting apparatus, a pair of stationary frames, tiltable object and image receiving members mounted in said frames respectively, a rotatable member carried by the object receiving member, an element movably mounted on said object receiving member and adapted to support an object to be projected, and means operable from the frame which carries the image receiving member for rotating said rotatable member and shifting said element with respect to said rotatable member.

51. In a projecting apparatus, an object receiving means comprising a rotatable member, an element movably mounted on said member and adapted to support an object to be projected, said member having gear teeth on its periphery means comprising a gear connected to said element for shifting the same, and actuating means shiftable into one position for meshing with said gear teeth and to another position for meshing with said gear.

52. Apparatus for projecting tilted aerial photographs to their horizontal equivalents, said apparatus comprising a lens, a support, a frame mounted in said support for tilting about a fixed axis perpendicular to the axis of the lens, a member slidably carried thereby, a rotatable member carried by said slidable member, an image receiving grid screen, and means supporting said screen in said rotatable member for movement in directions at right angles to each other.

53. Apparatus for projecting tilted aerial photographs to their horizontal equivalents, said apparatus comprising a lens, a support, a frame mounted in said support for tilting about a fixed axis perpendicular to the axis of the lens, a member slidably carried thereby, a rotatable member carried by said slidable member, a frame slidably mounted in said rotatable member, an image grid screen, a supporting frame therefor supported by said slidably mounted frame for movement at right angles to the direction of travel thereof, and means for measuring the movements of the two last mentioned frames.

54. Apparatus for projecting tilted aerial photographs to their horizontal equivalents, said apparatus comprising a tiltable frame, a member slidably carried thereby, means causing shifting of said slidable member as an incident to tilting of said frame and in functional proportion to the angle of tilt thereof, a rotatable member carried by said slidable member, a frame slidably mounted in said rotatable member, an image screen supporting frame supported by said slidably mounted frame for movement at right angles to the direction of travel thereof, and means for measuring the movements of the two last mentioned frames.

55. Apparatus for projecting tilted aerial photographs to their horizontal equivalents, said apparatus comprising tiltable object and image receiving members, said object receiving member comprising a rotatable member and object supporting means carried by said rotatable member and shiftable in directions at right angles to each other, a unitary control adjacent said image receiving means, and connections between the control and the rotatable member and object supporting means for causing rotation of said rotatable member and shifting of said object supporting means.

56. Apparatus for projecting tilted aerial photographs to their horizontal equivalents, said apparatus comprising tiltable object and image receiving members, said object receiving member comprising object supporting means shiftable in directions at right angles to each other, a unitary control adjacent said image receiving means, and connections between the control and the rotatable member and object supporting means for causing shifting of said object supporting means.

57. Apparatus for projecting tilted aerial photographs to their horizontal equivalents, said apparatus comprising tiltable object and image receiving members, and means for shifting the image receiving member concurrently with tilting thereof and in functional proportion to the angle of tilt while the tilt axis thereof is fixed.

58. Apparatus for projecting tilted aerial photographs to their horizontal equivalents, said apparatus comprising a lens, a support, a frame tiltable in said support about a fixed axis at an angle to the lens axis, an image receiving screen on said frame having a plurality of lines whereby the distance from a given point on said screen of an image point coincident with any of said lines may be determined, means for shifting said screen to bring into coincidence with an image point the line nearest thereto, and means for measuring the extent of shift of said screen.

59. Apparatus for projecting tilted aerial photographs to their horizontal equivalents, said apparatus comprising a lens, a support, a frame tiltable in said support about a fixed axis at an angle to the lens axis, an image receiving screen carried by said frame, means comprising lines extending at right angles to each other on said screen for determining the location of image points, and means for shifting the screen with respect to the tiltable member.

60. In a projecting apparatus, an image frame, a rotatable member, an image receiving screen supported by said rotatable member, and a plurality of bearing units on said frame for supporting said rotatable member; each of said units comprising anti-friction means, an element carrying said anti-friction means, an arm on which said element is pivotally mounted, and means for adjusting said arm.

61. In a projecting apparatus, an image frame, a rotatable member, an image receiving screen supported by said rotatable member, and a plurality of bearing units on said frame for supporting said rotatable member; each of said units comprising a pivoted arm, an element pivotally carried by said arm, anti-friction members carried by said element on opposite sides of its pivot, and means for adjusting said arm.

62. In a projecting apparatus, an image receiving screen, supporting means therefor, an element provided with anti-friction bearing means cooperating with said supporting means, a pivoted arm carrying said element, a screw cooperating with said arm for varying the position thereof, and means for locking said arm in the position to which it is set.

63. In a projecting apparatus, image receiving means including a bearing element, a member movable on said element, a pivoted arm carrying said element means for varying the position on said arm, and means for locking said arm in set position.

64. In a projecting apparatus, an object frame, a rotatable member, an object receiving member supported by said rotatable member, and a plurality of bearing units on said frame for supporting said rotatable member; each of said units comprising anti-friction means, an element carrying said anti-friction means, an arm on which said element is pivotally mounted, and means for adjusting said arm.

65. In a projecting apparatus, an object frame, a rotatable member, an object supporting member supported by said rotatable member, and a plurality of bearing units on said frame for supporting said rotatable member; each of said units comprising a pivoted arm, an element pivotally carried by said arm, anti-friction members carried by said element on opposite sides of its pivot, and means for adjusting said arm.

66. In apparatus for projecting tilted aerial photographs to their horizontal equivalents, a lens, a support, an image frame mounted in said support for tilting about a fixed axis at a given angle to the lens axis, an image receiving grid screen carried thereby, and perforated elements carried by said frame and adjustable to bring their perforations opposite the main grid lines on said screen.

67. In apparatus for projecting tilted aerial photographs to their horizontal equivalents, a lens, a support, an image frame mounted in said support for tilting about a fixed axis at a given angle to the lens axis, an image receiving grid screen carried thereby and removable therefrom, and means comprising elements adjustable into a given relation to the main grid lines of said screen for enabling the point of intersection thereof to be located in said image frame after said screen is removed.

68. Apparatus for projecting tilted aerial photographs to their horizontal equivalents, said apparatus comprising a rotatable member, an element slidably carried by said rotatable member, an element slidably carried by the first mentioned element for movement at right angles to the direction of movement of said first mentioned element, an image receiving grid screen carried by the second mentioned slidable element, means for shifting said screen to bring the intersection of its two main grid lines into coincidence with the axis of rotation of said rotatable member, means for rotatably supporting said rotatable member, and a support in which the last mentioned means is slidably mounted.

69. Apparatus for projecting tilted aerial photographs to their horizontal equivalents, said apparatus comprising a rotatable member, an element slidably carried by said rotatable member, an element slidably carried by the first mentioned element for movement at right angles to the direction of movement of said first mentioned element, an image receiving grid screen carried by the second mentioned slidable element, means for shifting said screen to bring the intersection of its two main grid lines into coincidence with the axis of rotation of said rotatable member, means for rotatably supporting said rotatable member, a support in which the last mentioned means is slidably mounted, and means tiltably supporting said support.

70. Apparatus for projecting tilted aerial photographs to their horizontal equivalents, said apparatus comprising a lens, a tiltable member for receiving an object to be projected, a tiltable member for receiving an image of said object, means for maintaining the axes of both tiltable members perpendicular to lens axis and in a plane passing through said lens axis, means for tilting said members through equal and opposite angles, and means for shifting said members toward the intersection of their planes as tilted.

71. Apparatus for projecting tilted aerial photographs to their horizontal equivalents, said apparatus comprising a lens, a tiltable member for receiving an object to be projected, a tiltable member for receiving an image of said object, means for maintaining the axes of both tiltable members perpendicular to the lens axis and in a plane passing through said lens axis, means for tilting said members through equal and opposite angles, and means for shifting said members toward the intersection of their planes as tilted, each of said members being shifted an equal distance.

72. Apparatus for projecting tilted aerial photographs to their horizontal equivalents, said apparatus comprising a tiltable member for receiving an object to be projected, a tiltable member for receiving an image of said object, means for tilting said members, and means for shifting said members as an incident to their tilting movement and in functional proportion to the amount of tilt, said shifting means comprising equal arms pivoted at fixed points similarly located with regard to the respective tiltable members and engaging said members, respectively.

73. Apparatus for projecting tilted aerial photographs to their horizontal equivalents, said apparatus comprising a tiltable member for receiving an object to be projected, a tiltable member for receiving an image of said object, means for tilting said members, and means for shifting said members as an incident to their tilting movement and in functional proportion to the amount of tilt, said shifting means comprising equal arms pivoted at fixed points similarly located with regard to the respective tiltable members and engaging said members, respectively, at equal distances from their tilting axes.

74. Apparatus for projecting aerial photographs to their horizontal equivalents, said apparatus comprising a lens, a support, a frame mounted in said support for tilting about a fixed axis perpendicular to and intersecting the lens axis, an element slidably mounted on said tiltable member, a rotatable member mounted on said slidable element, an element slidably mounted on said rotatable member, an element slidably mounted on the second slidable element, a removable grid screen held in a pre-determined position in the third slidable element, said second and third slidable elements constituting means for coordinate motion of the grid screen relative to the axis of rotation of the rotatable member and perpendicular to said rotational axis, a stopping element shiftable into and out of the path of travel of the second slidable element, a stopping element shiftable into and out of the path of travel of the third slidable element, said stopping elements being adapted to bring the grid to rest with the intersection of its two main lines in coincidence with the axis of said rotatable member by intrusion of said stopping elements into the paths of motion of the respective second and third slidable elements.

75. In a projecting apparatus, a support, a member rotatably mounted thereon and having an annular bearing surface, an image receiving screen supported by said member, bearing elements in contact with the annular surface of said member, and means comprising swivel members supporting said bearing elements to insure distribution of load of said rotatable member among said bearing elements.

76. In a projecting apparatus, a support, a member rotatably mounted on said support and having an annular bearing surface, an object holder supported by said member, bearing elements in contact with the annular surface of said member, and means comprising swivel members supporting said bearing elements for equal distribution of load of said rotatable member among said bearing elements.

77. In a projecting apparatus, a support, a member slidably mounted on said support, a rotatable member supported by said slidable member, an image receiving screen supported by said rotatable member, a swivel member having bearing elements for supporting said rotatable member, an arm pivoted at one end to said swivel member and pivotally mounted on the slidable member at the other end, and means for moving said arm for adjusting the axis of said rotatable member into a pre-determined position relative to said slidable member.

78. In a projecting apparatus, a support, a member slidably mounted on said support, a rotatable member supported by said slidable member, an object holder supported by said rotatable member, a swivel member having bearing elements for supporting said rotatable member, an arm pivoted at one end to said swivel member and pivotally mounted on the slidable member at the other end, and means for moving said arm for adjusting the axis of said rotatable member into a pre-determined position relative to said slidable member.

79. In a projecting apparatus, a rotatable member, an image receiving screen supported by said member, a bearing element for said member, a pivoted arm pivotally carrying said element, means for varying the position of said arm, and means mounted on said bearing element for rotating said member.

80. In a projecting apparatus, a lens, tiltable object and image receiving members, means maintaining the axes of said members at a fixed distance from each other and in a plane passing through the lens axis, and means comprising a screw common to said members for simultaneously tilting the same through equal angles and causing linear displacement thereof through equal amounts.

81. In a projecting apparatus, a slide, a member rotatably supported by said slide, an image receiving screen supported by said member, a bearing element for said member, means for adjusting the position of said member relative to said slide, and means mounted on said element for rotating said member about an axis perpendicular to the plane of said screen.

82. In a projecting apparatus, a slide, a member rotatably supported by said slide, said rotatable member having gear teeth on its periphery, an image receiving screen supported by said member, a bearing element for said member, means for adjusting the position of said member relative to said slide, and means comprising a gear mounted on said element and meshing with the gear teeth on said member for rotating said member about an axis perpendicular to the plane of said screen.

83. Apparatus for projecting tilted aerial photographs to their horizontal equivalents, said apparatus comprising a rotatable member, an element carried by said rotatable member, supporting means permitting slidable motion of said element relative and perpendicular to the axis of said rotatable member, an element slidably carried by the first mentioned element for movement at right angles to the direction of movement of said first mentioned element, an image receiving grid screen carried by the second mentioned slidable element, means for shifting the first and second mentioned slidable elements in directions parallel to the grid lines of the screen to bring the intersection of the two main grid lines of the screen into coincidence with the axis of rotation of said rotatable member, means for rotatably supporting said rotatable member, and a support in which the last mentioned means is slidably mounted.

84. Apparatus for projecting tilted aerial photographs to their horizontal equivalents, said apparatus comprising a lens, a rotatable member, an element carried by said rotatable member, supporting means permitting slidable movement of said element relative and perpendicular to the axis of said rotatable member, an element slidably carried by the first mentioned element for movement at right angles to the direction of movement of said first mentioned element, an image receiving grid screen carried by the second mentioned slidable element, means for shifting the first and second mentioned slidable elements in directions parallel to the grid lines of the screen to bring the intersection of the two main lines of the grid screen into coincidence with the axis of rotation of said rotatable member, means rotatably supporting said rotatable member, a support in which the last mentioned means is slidably mounted, and means tiltable about a fixed axis perpendicular to the lens axis for supporting said support.

85. Apparatus for projecting tilted aerial pictures to their horizontal equivalents, said apparatus comprising a lens, a frame, means supporting said frame for tilting about a fixed axis perpendicular to the axis of a lens, a slidable member supported by said frame, means for displacing said slide as said frame is tilted; said means consisting of an arm rigidly connected to said slidable member at one end and connected to a pivotal bearing at the other end, means for guiding said pivotal bearing with its axis in the same plane with the lens and tilt axes and permitting motion thereof parallel to said lens axis.

86. Apparatus for projecting tilted aerial photographs to their horizontal equivalents, said apparatus comprising a lens, a member tiltable about an axis having a definite relation to the lens axis, an image receiving screen, means on said member for supporting said screen, a pivot member mounted on said tiltable member and with its axis perpendicular to the plane of said image screen, an arm mounted on said pivot member for pivotal movement about said axis, an element in contact with a bearing surface on said screen supporting means and carried by said arm, and means on said tiltable member for adjusting the position of said arm about said axis of said pivot member to thereby establish a position for said screen supporting means with respect to said tiltable member.

87. In a projecting apparatus, a lens, an image receiving screen, a slidable carriage having a horizontally extending bearing surface, a member on which said carriage is slidably mounted, a bearing element in contact with said bearing surface of said carriage and mounted on said member for movement about an axis perpendicular to the plane of said screen, and means on said supporting member for enabling said bearing element to be adjusted about the first mentioned axis to thereby establish a desired position for said carriage with the bearing surface thereof in a horizontal plane.

In testimony whereof, I have signed my name to this specification this 23rd day of July, 1930.

EDWARD H. CAHILL.